United States Patent [19]
McNeilus et al.

[11] Patent Number: 6,089,813
[45] Date of Patent: Jul. 18, 2000

[54] HYDRAULIC OPERATED SYSTEMS UTILIZING SELF LUBRICATING CONNECTORS

[75] Inventors: Garwin B. McNeilus; William P. Bartlett, both of Dodge Center, Minn.

[73] Assignee: McNeilus Truck and Manufacturing, Inc., Dodge Center, Minn.

[21] Appl. No.: 08/752,220

[22] Filed: Nov. 19, 1996

[51] Int. Cl.⁷ .................................................. B65G 67/02
[52] U.S. Cl. ......................... 414/406; 414/408; 414/409; 298/22 R
[58] Field of Search .................................... 414/404, 406, 414/408, 409; 298/22 R, 22 P, 19 R, 25; 384/908, 909, 912, 913

[56] References Cited

U.S. PATENT DOCUMENTS

| | | |
|---|---|---|
| 3,594,049 | 7/1971 | Turner . |
| 3,950,047 | 4/1976 | Capelli . |
| 3,969,232 | 7/1976 | Turner . |
| 4,056,478 | 11/1977 | Capelli . |
| 4,361,367 | 11/1982 | Statz ............................................ 308/78 |
| 4,941,671 | 7/1990 | Ellingsen .................................... 280/91 |
| 4,949,593 | 8/1990 | Vignoli et al. ............................. 74/566 |
| 4,986,716 | 1/1991 | Winter ...................................... 414/409 |
| 5,316,430 | 5/1994 | Horning et al. .......................... 414/409 |
| 5,360,310 | 11/1994 | Hones et al. ............................. 414/409 |
| 5,423,232 | 6/1995 | Miller et al. . |
| 5,427,496 | 6/1995 | Ratledge, Jr. et al. .................. 414/409 |
| 5,505,576 | 4/1996 | Sizemore et al. ........................ 414/409 |
| 5,525,022 | 6/1996 | Huntoon .................................. 414/409 |

OTHER PUBLICATIONS

Nylatron® GSM Blue Nylon Machining Stock, ©1995 The Polymer Corporation Apr. 1995.
Engineering Plastic Products, ©1992 The Polymer Corporation 1 May 1994.
Plastic Bearing Design Manual, ©The Polymer Corporation SBTB–2 May 1992.
Monocast & Nylatron GSM Nylon, The Polymer Corporation 2.5M–Aug. 1991.
Sheave Design Manual for Nylatron® GSM Nylon, ©1993 The Polymer Corporation Jun. 1993.
Nylatron® Nylon Gear Design and Fabrication Manual, The Polymer Corporation May 1987—5M.

*Primary Examiner*—Douglas Hess
*Attorney, Agent, or Firm*—Nikolai, Mersereau & Dietz, P.A.

[57] ABSTRACT

A collection vehicle including a material handling system, storage body, compaction system, storage system, and dump system all of which have contact surface areas, wherein the surface areas are self-lubricating. The surface areas may be found in the vehicle's fluid biased cylinder bushings, tailgate hinges, storage body pivot joints, articulated joints, rotation joints, and slides. The self-lubricating, low friction, surface areas reduce wear and repair associated with conventional collection vehicle.

18 Claims, 7 Drawing Sheets

HYDRAULIC OPERATED SYSTEMS UTILIZING SELF LUBRICATING CONNECTORS

BACKGROUND OF THE INVENTION

I. Field of the Invention

This invention relates generally to a self-lubricating collection vehicle and more particularly, this invention relates to surface areas of moving parts of a collection vehicle body that are in frictional contact, wherein the surface areas are self-lubricating. The surface areas may be found in the vehicle's fluid biased cylinder bushings, tailgate hinges, storage body pivot joints, articulated joints, rotation joints, and slides. The self-lubricating, low friction, surface areas reduce wear and repair associated with conventional collection vehicle.

II. Discussion of the Related Art

Front or side loading collection vehicles of the conventional variety generally include a storage body, a charging hopper, a loading mechanism, and a compacting mechanism all mounted on the vehicle. The loading mechanism typically may include many articulated members fashioned to cooperate as joined by swivelling or rotating joints as they operate to engage, lift, and empty a container of interest into the associated charging hopper. One compacting mechanism is contained within each charging hopper compartment of which may be partitioned into several compartments, and typically includes a ram or packer which operates to direct and pack the collection material into a corresponding compartment in the storage body. The packer is typically operated on slides by at least one bushing-mounted fluid cylinder between a fore and aft position.

Collected material is compacted rearward in the storage body, and removed through a rear access by tilting the storage body. A tailgate, pivotally hinged to the storage body, encloses the rear access of each compartment closure during the collection efforts. The tailgate is actuated between an open and a closed position by more bushing-mounted fluid based cylinders. Likewise, the storage body itself is typically tilted about pivot joints by fluid based cylinders.

A collection vehicle of this type requires routine maintenance. Specifically, the pivot joints, bushing mounted cylinders, tailgate hinges, articulated joints, rotation joints and slides all require periodic lubrication. Grease fittings are typically provided for all these devices, which access a corresponding surface. Other surfaces, such as bearings may be sealed requiring removal of access parts to lubricate. The system requires renewal of lubricating materials at regular intervals. Oftentimes, the maintenance of the vehicle does not include renewal of lubrication to the entire system. Several of the grease fittings may be positioned on or within the vehicle in difficult to reach places. In these instances the fittings may be overlooked, rather than taking the additional time to renew the lubricants through these fittings. Even when the system's lubricant is renewed regularly, the high usage of the system may break down the lubricant at a rate greater than a practical maintenance schedule. Also, the surface area covered with lubrication or grease may tend to collect dirt, which later may score the corresponding surface area. While strides have been made, a need clearly persists for a low maintenance, lubeless, collection vehicle. The present invention meets these needs.

SUMMARY OF THE INVENTION

The purpose of the present invention is to provide a collection vehicle including a storage body, a charging hopper, a loading mechanism, and a compacting mechanism all mounted on the vehicle and having self-lubricating (Tubeless) pivot joints, tailgate hinges, bushings, bearings, articulated joints, rotation joints and the like. The storage body is pivotally mounted to the collection vehicle chassis by one or more Tubeless pivot joints and is aligned with the compacting mechanism. Those skilled in the art will appreciate that a variety of single or multiple compartment storage bodies may be used in accordance with the present invention, wherein each type of storage body pivots to a dump position and so includes rotation or pivot joints. Without limitation, one such storage body suitable for use is described in U.S. application Ser. No. 08/570,676, filed on Dec. 11, 1995, (now abandoned) which is assigned to the same assignee as the present invention, the contents of which is hereby incorporated by reference.

A loading mechanism that approaches, grabs, lifts, dumps and returns a variety of containers, may be used to load the collection materials into the charging hopper. Such a loading mechanism may include a variety of self-lubricating swivelling or rotating joints connecting articulated sections. A complete description of one such suitable grabber system having articulated joints is shown and described in U.S. application Ser. No. 08/596,648, filed on Feb. 5, 1996, now U.S. Pat. No. 5,720,789, issued Feb. 24, 1998, which is assigned to the same assignee as the present invention, and the contents of which are hereby incorporated by reference in their entirety for any necessary purpose. A complete description of a bucket-type loading mechanism having a variety of rotary and roller followers is shown and described in U.S. application Ser. No. 08/596,731, filed on Feb. 5, 1996, (now abandoned) which is also assigned to the same assignee as the present invention, the contents of which are also hereby incorporated by reference. Additionally, components of either the storage body or the loading mechanism may be rotated, actuated, lifted, and/or tilted by a corresponding fluid biased cylinder of known construction. The fluid biased cylinders of the present invention include Tubeless rotation bearings or pivot bushing sleeves.

The compacting mechanism includes at least one packer or packing panel for charging the collection material through a charging opening and into the storage body. Front and side loading packers are usually designed to be linearly displaced by a pair of packing cylinders. Each such packer typically rides on slides or a friction reducing wear surface system including bottom rails or tracks, guide shoes and wear pads which direct and align the packer as it is displaced between the stowed and packing positions. A complete description of such a system including the guide shoes and wear pads suitable for use with the present invention is shown and described in U.S. application Ser. No. 08/717,485, now abandoned, filed on Sep. 20, 1996, titled "REPLACEABLE WEAR SYSTEM", which is assigned to the same assignee as the present invention, the contents of which are also hereby incorporated by reference in their entirety for any necessary purpose to provide added details of the packer, wear shoes or wear pads.

Each of the Tubeless bearings, pivot joints, hinges, articulated joints, rotation joints, and slides includes a surface area that contacts corresponding moving parts of the refuse vehicle, and is manufactured from a resilient and impact resistant, abrasion and wear resistant, generally self-lubricating, low coefficient of friction material. The material is preferably moisture and corrosion resistant and dimensionally stable. Without limitation, the material may be a polyamide including cast machinable nylons, modified polyamide, polyacetal, modified polyacetal, polyetheretherketone, certain PTFE fluoro hydrocarbon polymers, polyethylene terphthalate (PET) and modified PET. Modifications to these materials may include the incorporation of MoS$_2$ and/or a lubricating substance such as oil into the material. Without limitation, other lubricating materials may include a glass filter, PTFE particles, carbon powder or fibers, or other solid lubricants.

OBJECTS

It is accordingly a principle object of the present invention to provide a collection system for a material collection vehicle that does not require periodic lubrication maintenance.

It is also an object of the present invention to provide such a collection system for a refuse vehicle having tubeless components of the storage body, hinged tailgate, material handling system and compacting mechanism.

Another object of the invention is to provide a collection vehicle having fluid cylinder bushings, pivot joints, tailgate hinges, articulated joints, rotation joints and slides that do not require external periodic lubrication.

Still another object of the invention is to provide a collection vehicle including tubeless components of the storage body, hinged tailgate, material handling system and compacting mechanism.

These and other objects, as well as these and other features and advantages of the present invention will become readily apparent to those skilled in the art from a review of the following detailed description of the preferred embodiment in conjunction with the claims and accompanying drawings keeping in mind that like numerals in the several views refer to corresponding parts.

DETAILED DESCRIPTION

Figure 1:
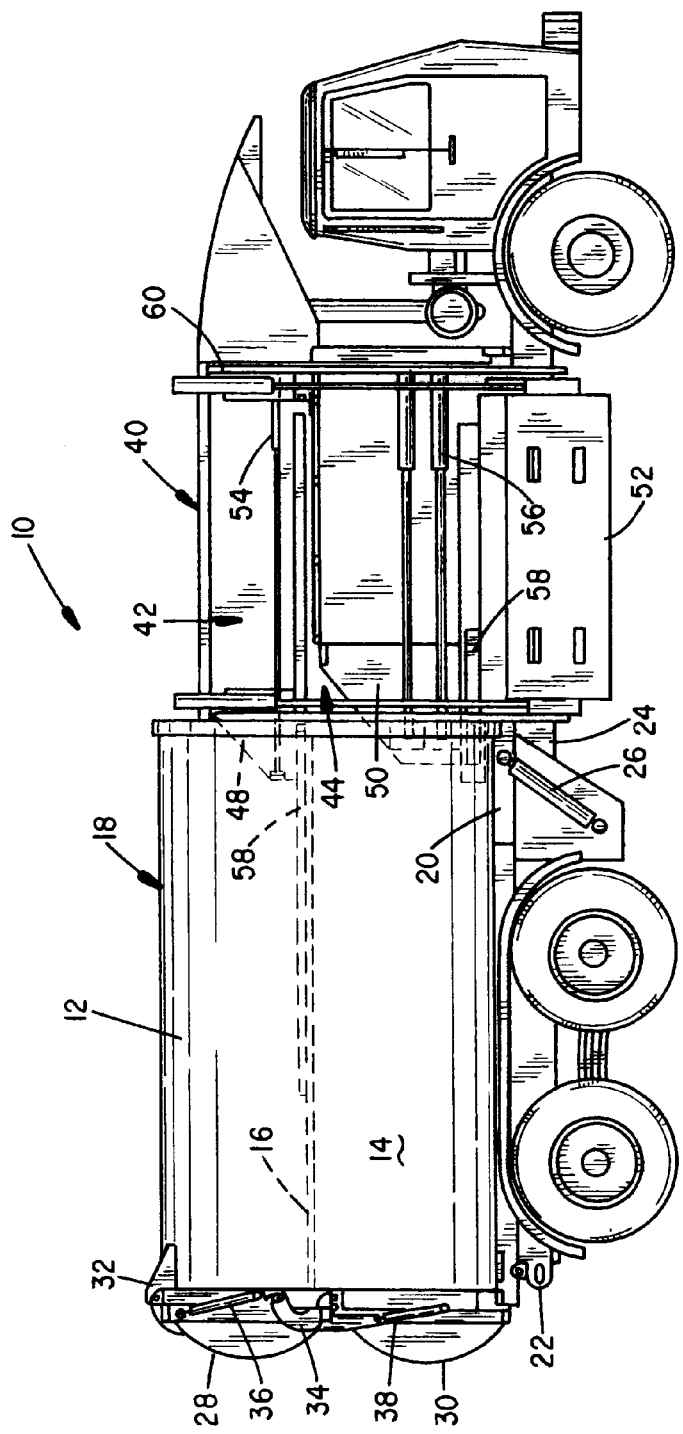
FIG. 1 is a side elevational view of a two-compartment side-loading refuse vehicle in accordance with the invention.

The various FIGS. 1–7 represent a collection of several alternative vehicle mounted collection systems, the application to which the principles of the present invention may be readily appreciated. In conjunction with the several views of the figures, relevant details of selected representative embodiments will next be presented. Referring first to FIG. 1, a collection vehicle is shown in side elevation generally at 10. The vehicle 10 includes a multi-compartment storage body defining a storage volume subdivided into an upper storage compartment 12 and lower storage compartment 14 separated by an internal dividing wall 16.

Figure 3:
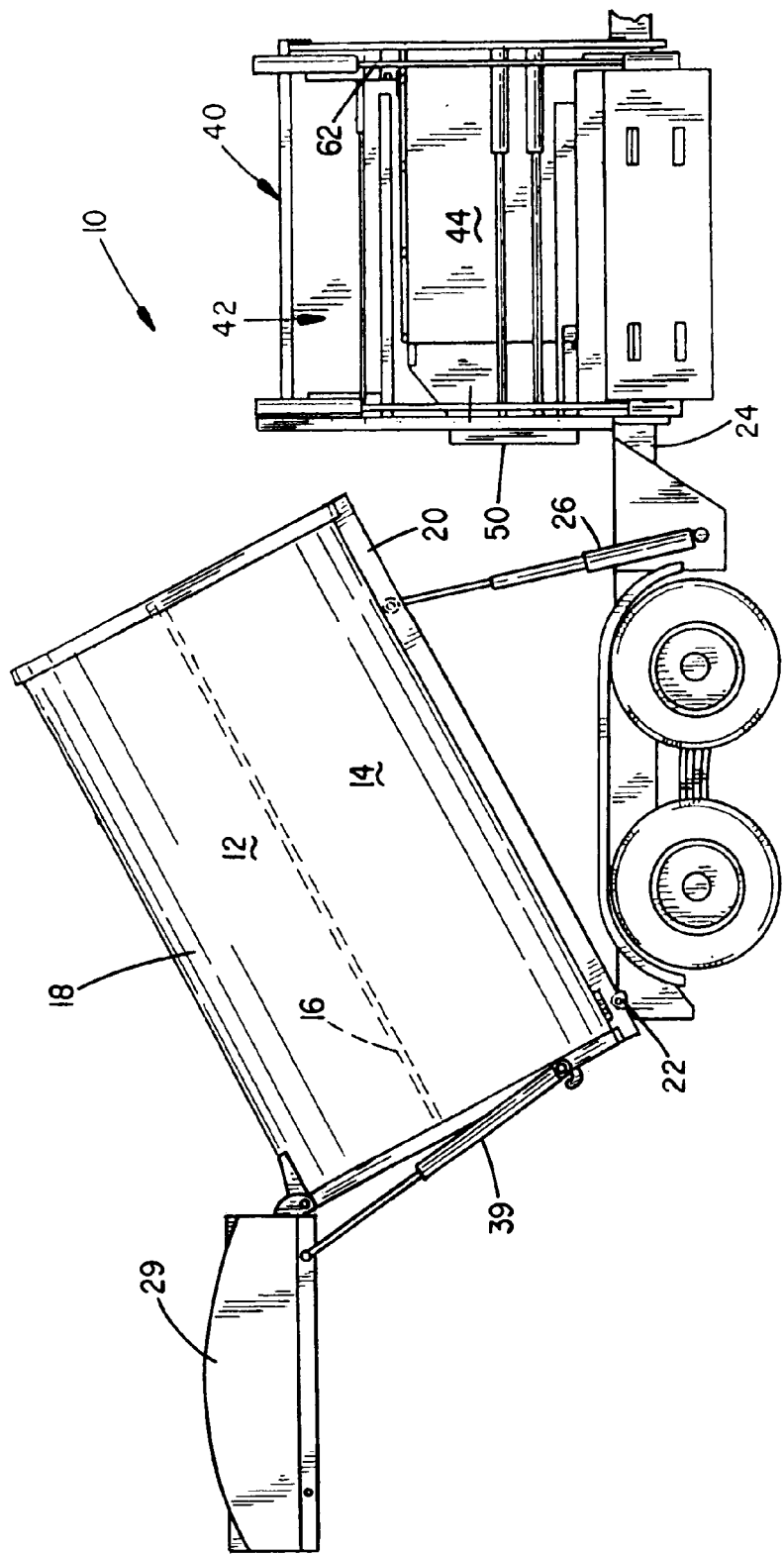
FIG. 3 is a side elevational view of a single compartment side-loading refuse vehicle including a removable body in the dump position.
Figure 4:
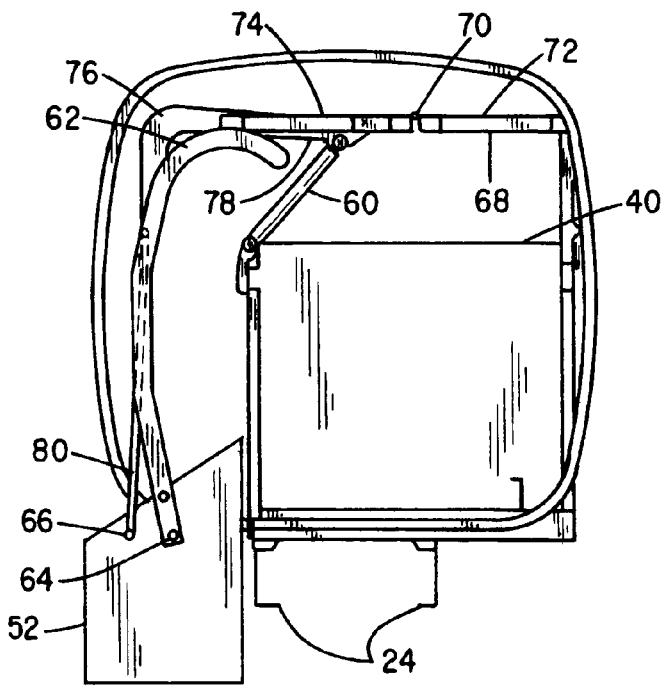
FIG. 4 is a sectional view of the loading bucket mechanism having rotation joints of the present invention, depicting the bucket in the lowered or loading position.
Figure 5:
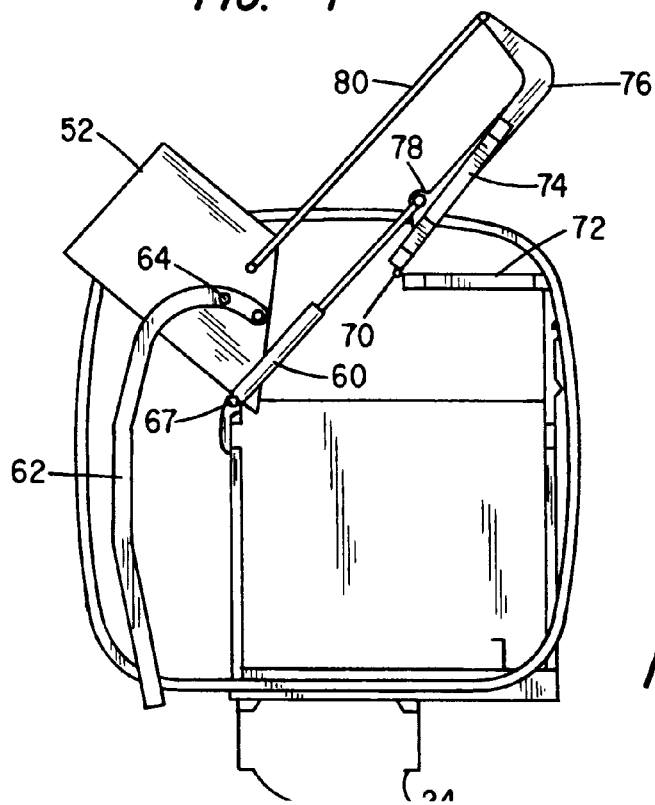
FIG. 5 is a loading bucket mechanism of the type shown in FIG. 4, shown in the fully raised or discharging position.
Figure 6:
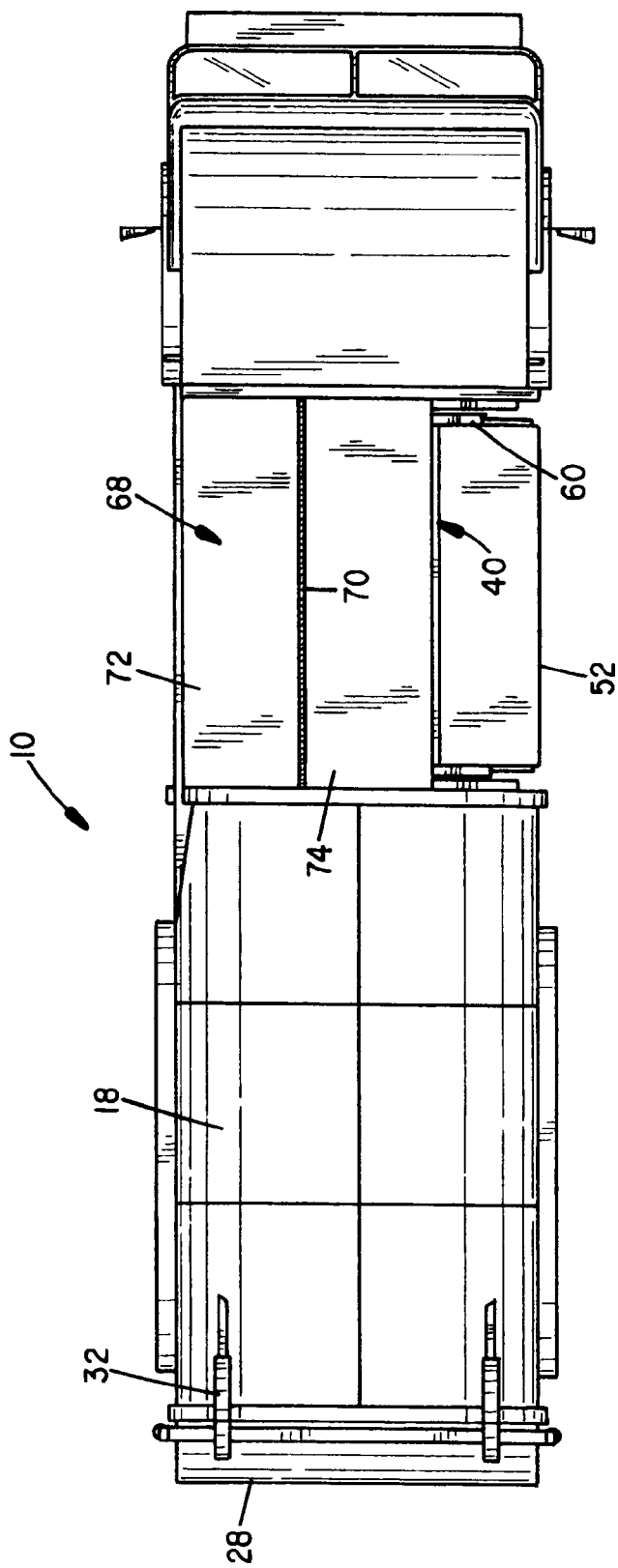
FIG. 6 is a top plan view of the refuse vehicle of FIG. 1.

The storage body 18, comprising the upper and lower storage bodies 12 and 14, is pivotally mounted on the refuse truck as a tilt-up system. Without limitation, the storage body 18 is mounted on a tilt frame 20 which, in turn, is pivotally mounted by at least one pivot joint 22 to truck frame or chassis 24 and extends longitudinally there along. The tilt frame 20 is operated by a pair of tilting cylinders 26 (one of which is shown in FIG. 3) which extend to lift the forward end of the storage body 18, pivoting the storage body 18 about the pivot joints 22 and chassis 24, during a dumping cycle. Further details and other removable body systems usable with the invention are described and shown in U.S. patent application Ser. No. 08/377,146, filed Jan. 23, 1995, (now abandoned) by Garwin B. McNeilus and Ronald E. Christenson, and U.S. patent application Ser. No. 08/398,954, filed Mar. 2, 1995, by Ronald E. Christenson, now U.S. Pat. No. 5,562,390, issued Oct. 8, 1996, which is a continuation-in-part of the Ser. No. 08/377,146 application, both of which are hereby incorporated by reference in their entirety for any necessary purposes.

Figure 8:
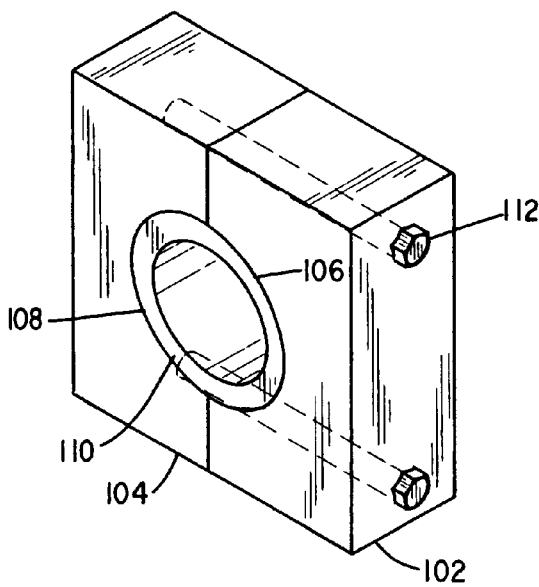
FIGS. 8–10 are perspective views of pillow blocks adaptable for use as a pivot joint attached to the storage body which include a bushing of the type of the present invention.
Figure 9:
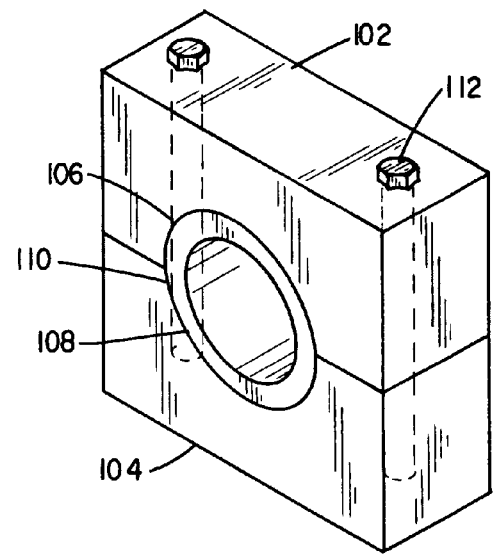
Figure 10:
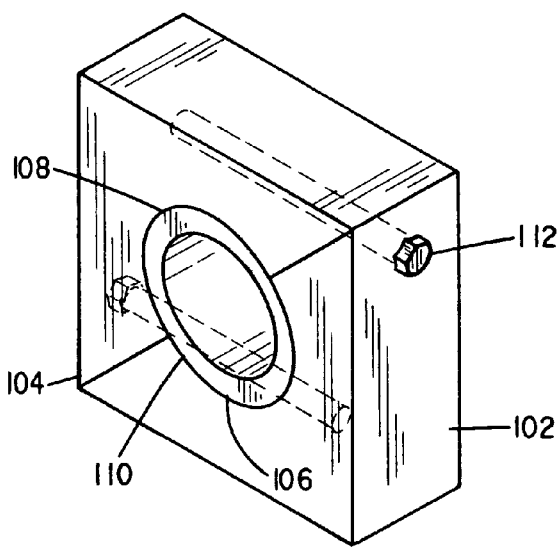

FIGS. 8–10 illustrate a pillow block or cap and cradle system 100 suitable for use on the anywhere a heavy duty pivot hinge is required. For example, the pillow block may be used with either a truck body tilting system or lifting mechanism for large containers such as dumpster boxes. For exemplary purposes, use of the pillow block 100 with a truck body tilting system will be discussed. The pillow block 100 may be attached to the tilt frame 20 or truck chassis 24 as pivot joint 22. The pillow block 100 has a cap 102 and cradle 104 each having a concave recess 106 and 108 respectively formed in one edge. The concave recesses are aligned diametrically opposite each other to form a bushing sleeve receiving bore. A bushing sleeve 110 is positioned within this bore and is adapted for receiving a tough, long wearing, rod, torque tube or pivot pin (not shown). The bushing sleeve 110 is preferably manufactured from a self-lubricating, low coefficient of friction material of the type described elsewhere in further detail. The rod, torque tube or pivot pin may be steel or other metallic material or may be a low friction, low wear, high strength polymer of the class used for the sleeve.

The cap 102 is removably attached to the cradle 104 as by bolts 112, but of course other known means of attachment may be used. The cradle 104 may be permanently attached to either the tilt frame 20 or truck chassis 24, whereas the pivot pin is attached to either the truck chassis 24 or tilt frame 20 and aligned opposite the cradle 104. Once the cradle 104 is attached, the bushing sleeve 110 is positioned to receive a torque tube or the like for alignment and engagement with the concave recess 108 of cradle 104. Cap 102 is then aligned and attached to cradle 104, thereby securing within the formed bore of the pillow block 100 the bushing sleeve 110. Of course, a pivot pin may be slipped into an assembled pillow block system and thereafter assembled with a pivoting hinge of a truck body or the like.

Each storage compartment 12 and 14 is provided with a separate tailgate as at 28 and 30 that close a respective discharge opening in the rear of the storage body 18. Each tailgate 28 and 30 is pivotally mounted on tailgate hinges 32 and 34 respectively. The tailgate hinges 32 and 34 are attached to the storage body 18, wherein the tailgates 28 and 30 include pins that rotate within hinges 32 and 34 respectively. Thus, the tailgates 28 and 30 are operable between a closed position for retaining collection materials in the storage body 18 and an open position to allow discharge of the collection materials from the storage body 18. In this manner, material stored in the separate compartments 12 and 14 may be discharged separately. In the preferred embodiment, pairs of fluid biased cylinders 36 and 38 operate the tailgate between an open and closed position. FIG. 3 illustrates a single tailgate 29 pivotally mounted to storage body 18, wherein the tailgate 29 is shown opened by cylinder 39, and storage body 18 is pivoted in its dump position by cylinder 26.

The truck body 18 shown in FIG. 1 is designed to address or be integral with a multi-compartment charging hopper which is generally shown at 40. Charging hopper 40 includes an upper and lower charging hopper compartments 42 and 44 respectively, sharing common sidewalls. Those skilled in the art will appreciate that the charging hopper 40 may be a part of the truck body or a separate entity mounted to the truck frame 24 forward of the multi-compartment storage body 18, wherein compartments 42 and 44 are adapted to charge material into corresponding storage compartments 12 and 14. The upper and lower charging hopper compartments 42 and 44 each further have a packer, respectively at 48 and 50 associated therewith. The packers are linearly displaced by a pair of packing cylinders 54 and 56. Each packer preferably rides on slides or a friction reducing wear surface system 58 including bottom rails or tracks, guide shoes and wear pads which direct and align the packer as it is displaced between the stowed and packing positions. As recognized above, a complete description of such a system is shown and described in U.S. application Ser. No. 08/717,485, now abandoned, titled "REPLACEABLE WEAR SYSTEM", the entire disclosure of which has been incorporated herein above by reference.

The charging hopper 40 may be recessed to accommodate a side loading bucket 52. The loading bucket 52 is operated between stowed, lift and dump positions by a pair of cylinders 60. In one embodiment shown in FIGS. 4 and 5, the loading bucket 52 is situated alongside of the charging hopper 40 and its operation is guided by candy cane guide rails 62, rotation wheels 64, and rotation joints 66 from a lower loading position up into a dumping position above the charging hopper compartments 42 and 44. An access door 68 is attached at one end to a top edge of the charging hopper 40 and the other end is attached to the bucket 52. The door is divided into a fixed and rotatable segment 72 and 74 respectively by piano hinge 70 or other pivot system of known construction and covers the opening to the charging hopper 40 when the bucket 52 is in the stowed position (see FIGS. 4–6). In the preferred embodiment, the loading bucket 52 has a transverse divider or partition that separates the loading bucket into two separate (see FIG. 1) material collectors. It should be noted that the position of the upper packer 48 determines whether the upper charging hopper compartment 42, the lower charging hopper compartment 44, or both the upper and lower charging hopper compartments are loaded.

The fluid operated cylinder 60 of known construction is attached at a rotation joint 67 of the charging hopper 40 and the other end is pivotally attached to a rotation joint of the lifting arm 76 (attached to the rotatable segment 74) using a leveraging gusset member 78. The lifting arm 76 is linked to the bucket 52 by linkage rod 80.

In this manner, as the cylinder 60 extends, the lifting arm 76 pivots upward. The linkage rod 80 pulls the loading bucket 52 up and rollers 64 attached to the outer edges of the loading bucket follow the candy cane guide rail 62. The rotational segment 74 of the hinged cover 68 pivots open so that when the loading bucket 52 becomes inverted, the hopper is partially opened. The moveable portion 74 of the hinged cover 68 also serves to deflect the collection material into the charging hopper 40.

Figure 7:
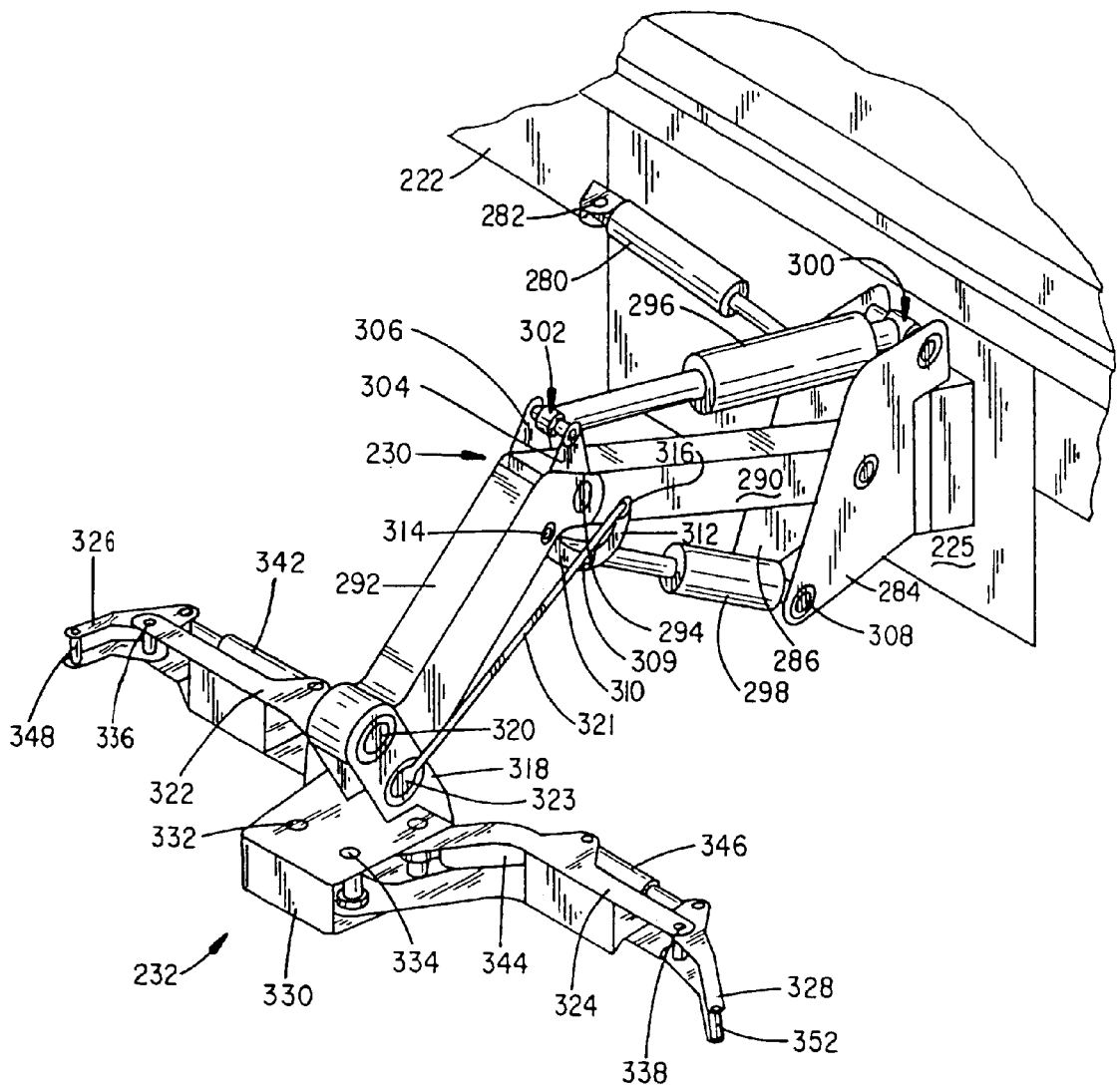
FIG. 7 is an enlarged fragmentary perspective view illustrating the details of a loading mechanism of the grabber type.

The loading bucket mechanism may alternatively be replaced as with a grabber system 232 shown in FIG. 7. An articulated arm 230 includes inner and outer segments 290 and 292 generally sequentially and vertically pivotally connected at a central joint 294. The segment 292 carries the grabber system 232. The joints of the system, particularly those of the articulated arm, may be provided with resilient bushings to cushion the operation of the system and increase the life of the mechanical joints, preferably of a self-lubricating, low friction material as further described below.

The segmented arm 230 is operated by a pair of linear actuators, preferably hydraulic cylinders, including an upper or reach controlling cylinder 296 and a lower or lift cylinder or lift/tipping or dumping cylinder 298, each being mounted with a free end and a pivotally connected fixed end. The actuator 296 is pivotally connected between a wrist pin pivot joint 300 connected between mounting plates 284 and 286 and a second wrist pin type pivot joint 302 connected between spaced lugs 304 and 306 fixed at the outer end of the segment 290. The lift cylinder or actuator 298 is also connected at its fixed end pivotally between the mounting plates 284 and 286 at 308. The free end of the actuator 298 is connected to a common pin member 309 that joins the common joint of spaced pairs of arcuate linkage elements connected between the arm elements 290 and 292 and on either side thereof, one pair of which is shown at 310 and 312. Element 310 is connected to arm segment 292 at 314 and element 312 to segment 290 at 316. A grabber mounting and pivot segment 318 pivotally connects the grabber system 232 to the free end of arm segment 292 at 320. A pair of spaced operating following rods or linkage bars one of which is shown at 321, are leveraged between an offset connection to a connecting link segment 318 at 323 and a common connection at the linkage element arm segment joint 316. These flank the arm segments 290, 292 on either side and with the linkage members 310, 312 pivot the grabber 232 for dumping as the lift cylinder 298 is extended as will be described.

The grabber 232, as shown, includes opposed digits or compound jaw elements having inner segments 322 and 324 flanked by outer segments 326 and 328. The inner segments 322 and 324 are pivotally connected to a base element 330 at pins 332 and 334, respectively, and outer segments 326 and 328 likewise are pivotally connected to the respective inner elements at 336 and 338. The jaw elements are operated to close or open to seize or release a rigid container, by pivotally connected, oppositely disposed pairs of linear actuators, including inner (not shown) and outer actuators 342 operating connected jaw elements 322 and 326, respectively, and inner and outer actuators 344 and 346, in a like and symmetric manner, operating respective jaw elements 324 and 328. Roller members 348 and 352 mounted in the jaw elements 326 and 328 guide the outer digit or jaw segments in following the periphery of a container of interest to be seized. Most or all of these animated connections are preferably made with self-lubricating interacting friction surfaces so that regular periodic lubrication requirements are avoided. The roller member may be made from a low friction, self-lubing material.

Figure 2:
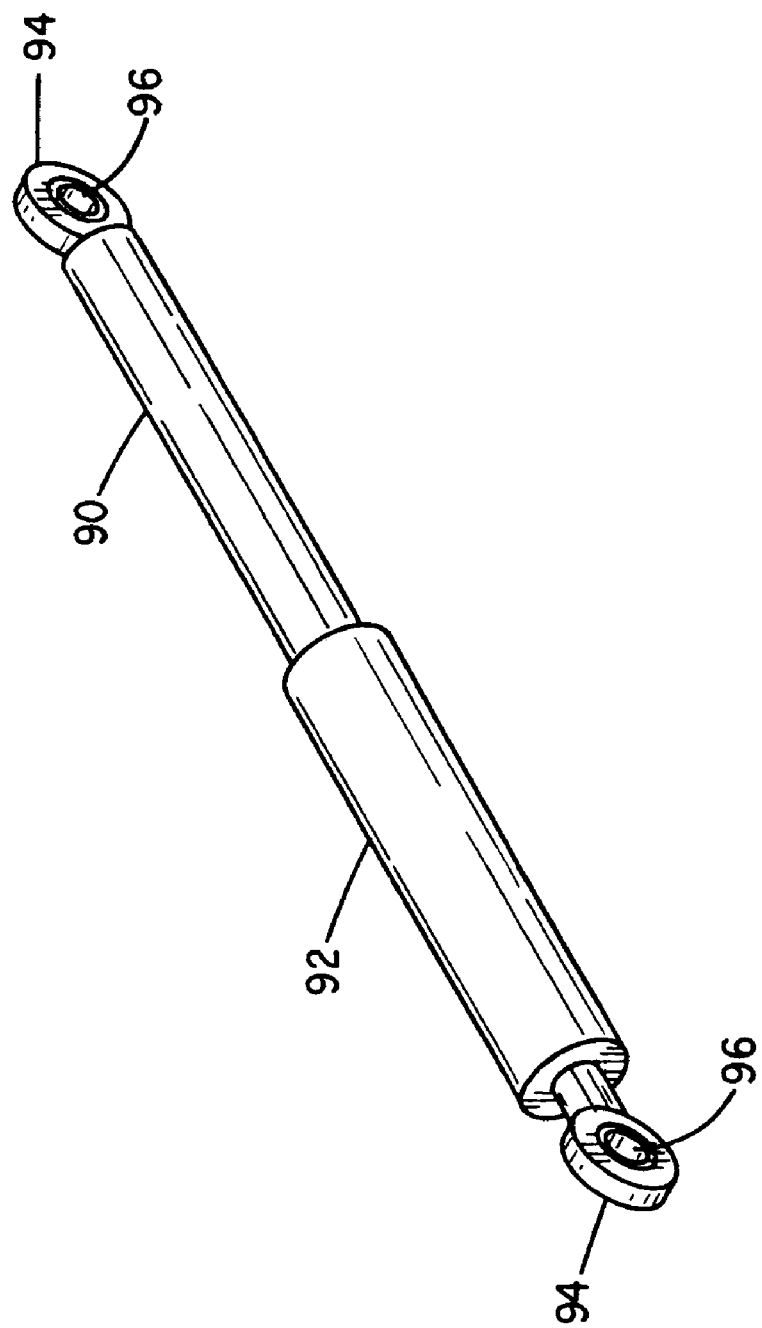
FIG. 2 is a perspective view of a fluid biased cylinder including a bushing of the type of the present invention.

The tilt cylinder 26, tailgate cylinders 36 and 38, packing cylinders 54 and 56, bucket cylinders 60, and/or grabber system cylinders 296, 298, 342, 344, and 346 may comprise a fluid biased cylinder of the present invention shown in FIG. 2. The cylinder comprises a rod 90 and head 92 of known construction and biased in a known manner. Attached to the free end of the rod 90 and head 92 are connecting pivot rings 94. The rings are pivotally mounted on pins that are attached to various components of the collection vehicle and allows the cylinder to pivot about the ring's rotational axis. A bushing 96 of the reduced friction, self-lubricating variety is positioned within each ring 94.

The bushing 96 preferably has a wear collar that is manufactured from a non-metallic, self-lubricating, low coefficient of friction material selected from a group of materials that includes materials such as a polyamides, modified polyamides, polyacetals, modified polyacetals, polyetheretherketone, certain fluoro hydrocarbon polymers, polyethylene terphthalate (PET) and modified PET. Such materials are low in abrasion and have a low coefficient of friction and so require no separate lubricating material to be applied during the life of the cylinders. The bushing's material also may incorporate friction and wear reducing components in the material itself. The pivot joints, tailgate hinges, slides, rotation joints, and grabber articulated joints preferably likewise incorporate this low-friction material on all wear surface areas that contact (through rotation, pivoting, sliding or otherwise) mating parts of the collection vehicle. In this manner, a vehicle mounted collection and processing system can be produced which eliminates the need for periodic lubrication.

This invention has been described herein in considerable detail in order to comply with the Patent Statutes and to provide those skilled in the art with the information needed to apply the novel principles and to construct and use such specialized components as required. However, it is to be understood that the invention could be carried out by specifically different equipment and devices, and that various modifications, both as to the equipment details and operating procedures, can be accomplished without departing from the scope of the invention itself.

What is claimed is:

1. A collection vehicle including a material handling system for loading, packing, hauling and unloading collection materials utilizing a collection body system dedicated to material handling and mounted on a collection vehicle chassis, said collection body system comprising:
   (a) a plurality of fluid operated cylinders having rod and blind ends, each end pivotally mounted on a bushing, said plurality of cylinders adapted for operating the material handling system;
   (b) a collection vehicle chassis and a storage body defining a storage volume having one or more dedicated storage compartments, said storage body being pivotally mounted to the collection vehicle chassis by one or more pivot joints for pivoting said storage body about said pivot joints relative to said chassis;
   (c) one or more tailgate means for closing one or more rear discharge openings of said storage body, corresponding to said one or more dedicated storage compartments, said tailgate means being pivotally mounted on tailgate hinges attached on said storage body of said collection body system and operable between a closed position for retaining collection materials in said storage body and an open position to allow discharge of said collection materials; and
   (d) wherein said cylinder bushings, said tailgate hinges and said storage body pivot joints have surface areas that contact moving parts, wherein said surface areas comprise a non-metallic, low coefficient of friction material which autogenously provides a lubricious bearing surface requiring no separate lubricating material.

2. The collection vehicle of claim 1, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

3. The collection vehicle of claim 1, wherein the material handling system further comprises a grabber having a plurality of articulated joints, wherein the articulated joints have surface areas that contact moving parts, wherein the surface areas of said articulated joints comprise a non-metallic, low coefficient of friction material which autogenously provides a lubricious bearing surface requiring no separate lubricating material.

4. The collection vehicle of claim 3, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

5. The collection vehicle of claim 1, wherein the material handling system further comprises a bucket having rotation joints, wherein the rotation joints have surface areas that contact moving parts, wherein the surface areas of said rotation joints comprise a non-metallic, low coefficient of friction material which autogenously provides a lubricious bearing surface requiring no separate lubricating material.

6. The collection vehicle of claim 5, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

7. A collection vehicle for collecting, packing, hauling, and unloading collection material, said vehicle comprising:
   (a) a storage body defining a storage volume having one or more dedicated storage compartments, said storage body being pivotally mounted to a chassis of the collection vehicle by one or more pivot joints for pivoting said storage body about said pivot joints relative to said chassis;
   (b) one or more tailgate means for closing a rear discharge opening of said storage body, said tailgate means being pivotally mounted on tailgate hinges attached to said storage body and operable between a closed position for retaining collection materials in said storage body and an open position to allow discharge of said collection materials;
   (c) a charging hopper chamber and associated compacting means for charging the collection material through a charging opening associated with each said one or more dedicated storage compartments in said storage body, said compacting means having slides for sliding between a fore and aft position;
   (d) a loading mechanism for loading the collection materials into the charging hopper, said loading mechanism including a plurality of fluid biased cylinders having rod and head ends, each end pivotally mounted on a bushing, said plurality of cylinders adapted for operating the loading mechanism; and
   (e) wherein said cylinder bushings, said tailgate hinges, said slides and said storage body pivot joints have surface areas that contact moving parts, wherein said surface areas comprise a non-metallic, low coefficient of friction material which autogenously provides a lubricious bearing surface requiring no separate lubricating material.

8. The collection vehicle of claim 7, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

9. The collection vehicle of claim 7, wherein the loading mechanism further comprises a grabber having a plurality of articulated joints, wherein the articulated joints have surface areas that contact moving parts, wherein the surface areas of said articulated joints comprise a non-metallic, low coefficient of friction material which autogenously provides a lubricious bearing surface requiring no separate lubricating material.

10. The collection vehicle of claim 9, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

11. The collection vehicle of claim 7, wherein the loading mechanism further comprises a bucket having rotation joints, wherein the rotation joints have surface areas that contact moving parts, wherein the surface areas of said rotation joints comprise a non-metallic, low coefficient of friction material which autogenously provides a lubricious bearing surface requiring no separate lubricating material.

12. The collection vehicle of claim 11, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

13. A collection vehicle for collecting, packing, hauling, and unloading collection material, said vehicle comprising:
(a) a storage body pivotally mounted to a chassis of the vehicle, wherein a lift means pivots the storage body between a stowed and a dump position;
(b) a charging hopper attached to said vehicle, said charging hopper including a plurality of openings each opening being in continuous communication with a corresponding material-receiving compartment of said storage body;
(c) at least one compacting means contained within said charging hopper and associated with at least one material-receiving compartment for compacting non-recyclable or compactable recyclable materials;
(d) a loading mechanism for loading the collection materials into the charging hopper, wherein an actuation means for lifting the loading mechanism actuates the loading mechanism between a stowed and a dump position; and
(e) a tailgate which is hinged to the storage body to close a rear discharge opening, wherein a dump means for opening and closing the tailgate operate the tailgate between an open and closed position; and
(f) whereby at least one of said lift means, compacting means, actuation means and dump means includes a fluid biased cylinder having rod and head ends, each end pivotally mounted on a bushing, said bushing having a surface area that contacts moving parts, wherein said surface area comprises a non-metallic, low coefficient of friction material which autogenously provides a lubricious bearing surface requiring no separate lubricating material.

14. The collection vehicle of claim 13, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

15. The collection vehicle of claim 13, wherein the loading mechanism further comprises a grabber having a plurality of articulated joints, wherein the articulated joints have surface areas that contact moving parts, wherein the surface areas of said articulated joints comprise a non-metallic, low coefficient of friction material which autogenously provides a lubricious bearing surface requiring no separate lubricating material.

16. The collection vehicle of claim 15, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

17. The collection vehicle of claim 13, wherein the loading mechanism further comprises a bucket having a rotation joints, wherein the rotation joints have surface areas that contact moving parts, wherein the surface areas of said rotation joints comprise a non-metallic, low coefficient of friction material which autogenously provides a lubricious bearing surface requiring no separate lubricating material.

18. The collection vehicle of claim 17, wherein the non-metallic, low coefficient of friction material is selected from the group consisting of polyamides, modified polyamides, polyacetals, modified polyacetals, polyetheretherketone, certain chloro-fluoro hydrocarbon polymers, polyethylene terphthalate (PET) and modified PET.

* * * * *